Dec. 31, 1963  W. J. SCHRENK ETAL  3,115,674
BACKFLOW RESTRICTOR FOR EXTRUDERS
Filed Feb. 15, 1961
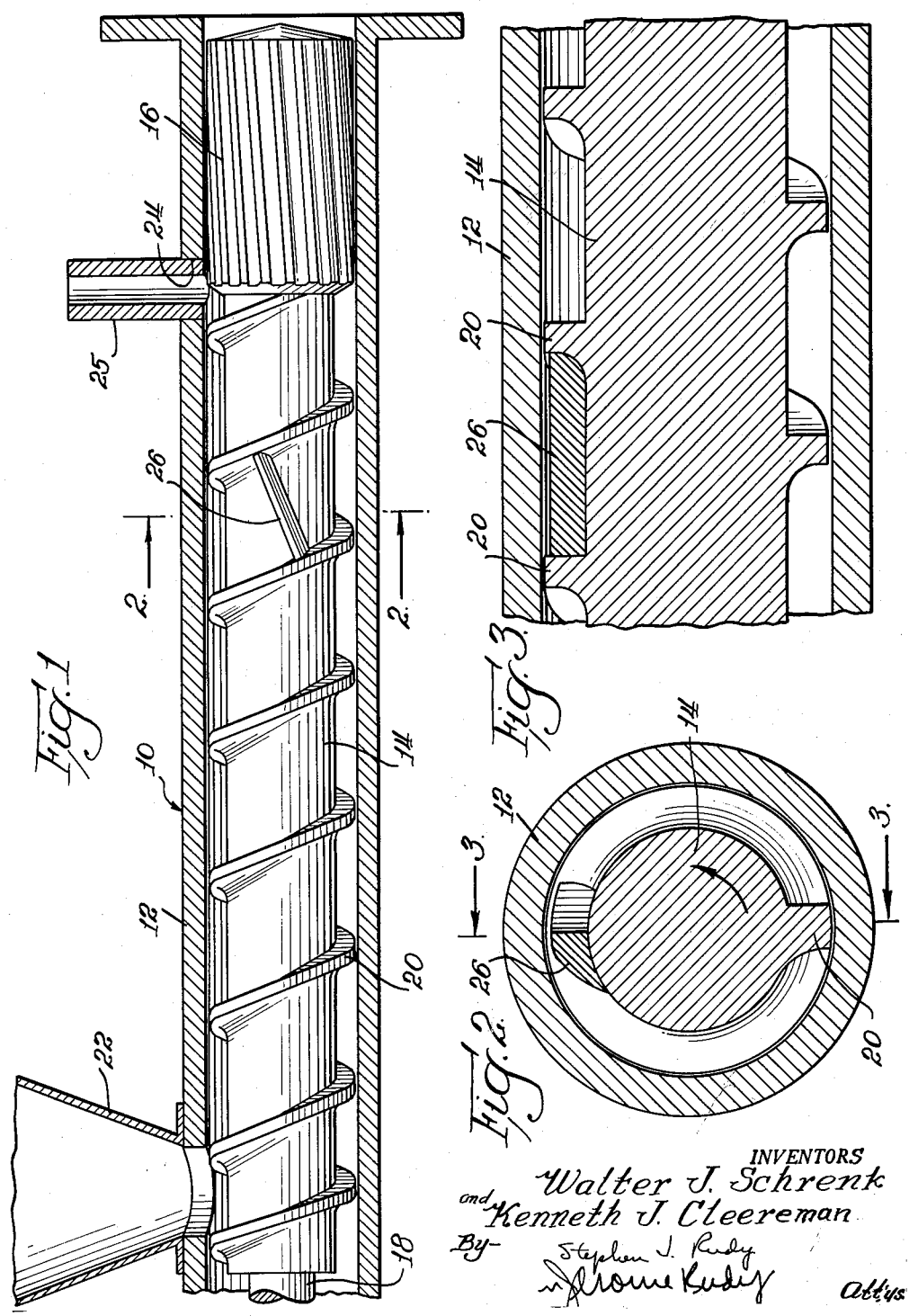
INVENTORS
Walter J. Schrenk
and Kenneth J. Cleereman
By Stephen J. Rudy
Jerome Rudy
Attys 3,115,674
Patented Dec. 31, 1963

3,115,674
BACKFLOW RESTRICTOR FOR EXTRUDERS
Walter J. Schrenk, Bay City, and Kenneth J. Cleereman, Midland, Mich., assignors to The Dow Chemical Company, Midland, Mich., a corporation of Delaware
Filed Feb. 15, 1961, Ser. No. 89,468
2 Claims. (Cl. 18—12)

This invention relates to a backflow restrictor for extruders.

Gaseous, or liquid additives are often added to molten polymers in an extruder, which additive frequently flows backward out of the extruder feed opening resulting in loss of additive, and possible reduction of polymer feed rate.

The backflow restrictor of the present invention provides a simple solution to the problem of preventing backflow of additive through an extruder. Briefly, the invention comprises the use of a restrictor which is inserted across an extruder screw flight at a point where the polymer is molten. The restrictor effectively reduces the flight depth for a small distance, which restricts backflow of the additive, while avoiding excessive restriction of forward pumping of the polymer. In such manner, a simple and effective means is provided for solving the problem of backflow in an extruder.

The main object of this invention is to provide a backflow restrictor for an extruder.

A more specific object is to provide a backflow restrictor for an extruder which will prevent backflow of additive fed into the extruder.

Another object is to provide a backflow restrictor for an extruder, which restrictor is of simple design and highly effective in use.

These and further objects and features of the invention will become more apparent from the following description and accompanying drawing wherein:

FIG. 1 is a partial section view illustrating an extruder having a restrictor in accordance with the present invention;

FIG. 2 is an enlarged section view generally as seen from line 2—2 in FIG. 1; and FIG. 3 is a section view as seen from line 3—3 in FIG. 2.

Referring now to the drawing, the numeral 10 identifies an extruder assemblage including a cylindrical extruder barrel, or housing 12, and a rotatable screw 14. The discharge end of the screw is provided with a mixing means 16, while the opposite end of the screw is provided with a shaft 18 for connection to a power means (not shown) for rotation of the screw. The screw 14 has a spiral thread 20 upon its periphery, the outer diameter of which forms a sliding fit within the extruder housing 12. A hopper 22 is arranged upon the extruder barrel 12 toward the rearward end, whereby material may be fed into the barrel. An inlet port 24, having a feed tube 25, is located in the extruder barrel 12 toward the discharge end, and in the same vertical plane as that of the hopper, which port may be used for admitting additives to the extruder barrel.

A backflow restrictor, according to the principles of the invention, comprises a rib, or throttling lug 26, which is arranged to extend substantially normal to the side walls of adjacent screw threads as shown. Lug 26 may be secured in position by welding, screws, etc. The height of the lug is less than the height of the screw thread so that the upper edge of the lug is located a short distance from the inner wall of the barrel 12. A lead side of the lug 26 is preferably curved, while the trailing side is normal to the screw body, as best seen in FIG. 2.

In one operative embodiment in which the bore of the barrel 12 was 1¼", the distance from the center of the screw 14 to the peripheral edge of the restrictor, was 0.605" while the distance, in an axial direction, from the mid-region of the restrictor 26 to the port 24, was approximately 1½". In this particular extruder assemblage, 1 lb. per hour of methyl chloride was added to 10 lbs. per hour of polystyrene, and no backflow of methyl chloride occurred during prolonged operation.

From the above description it will be seen that a backflow restrictor made in accordance with the principles of the invention, will satisfy the objectives set forth herein before.

The foregoing description has been given in detail without thought of limitation since the inventive principles involved are capable of assuming other forms without departing from the spirit of the invention or the scope of the following claims.

What is claimed is:

1. In an extruder assembly including a feed screw having a spiral thread and an additive inlet port near the discharge end of the extruder, a backflow restrictor comprising a rib extending between the side walls of adjacent screw threads said rib being arranged so that the lead end thereof is upstream from said inlet port, the outermost surface of said rib being arranged a uniform distance from the axis of said screw and at a slightly less distance than that of the outer periphery of the spiral thread, and being further arranged so that the longitudinal axis of said rib is substantially normal to the walls between adjacent screw threads at the point of juncture therewith.

2. In an extruder assembly having a feed screw backflow restrictor according to claim 1, wherein said rib has a curved surface on the lead side of the rib.

References Cited in the file of this patent

UNITED STATES PATENTS

| Re. 23,948 | Fuller | Feb. 15, 1955 |
| 2,378,539 | Dawihl | June 19, 1945 |
| 2,662,243 | Schnuck et al. | Dec. 15, 1953 |
| 2,719,325 | Franklin | Oct. 4, 1955 |
| 2,752,633 | Wertzel | July 3, 1956 |
| 2,810,159 | Teichmann | Oct. 22, 1957 |
| 2,868,517 | Lasch | Jan. 13, 1959 |
| 2,970,341 | Mallory | Feb. 7, 1961 |
| 3,026,273 | Engles | Mar. 20, 1962 |

FOREIGN PATENTS

| 809,465 | France | Mar. 3, 1937 |
| 841,643 | Germany | Apr. 30, 1952 |